(12) United States Patent
Lizotte

(10) Patent No.: US 6,884,962 B2
(45) Date of Patent: Apr. 26, 2005

(54) BEAM OR WAVE FRONT

(75) Inventor: Todd E. Lizotte, Manchester, NH (US)

(73) Assignee: Hitachi Via Mechanics, Ltd., Ebina (JP)

( * ) Notice: Subject to any disclaimer, the term of this patent is extended or adjusted under 35 U.S.C. 154(b) by 0 days.

(21) Appl. No.: 10/385,801

(22) Filed: Mar. 11, 2003

(65) Prior Publication Data

US 2003/0179452 A1 Sep. 25, 2003

Related U.S. Application Data

(60) Provisional application No. 60/365,405, filed on Mar. 18, 2002.

(51) Int. Cl.[7] .............................................. B23K 26/06
(52) U.S. Cl. ............................. 219/121.73; 219/121.7
(58) Field of Search ....................... 219/121.73, 121.7, 219/121.71, 121.68, 121.699, 121.75, 121.85, 121.69

(56) References Cited

U.S. PATENT DOCUMENTS

| | | | |
|---|---|---|---|
| 5,010,232 A | | 4/1991 | Arai et al. ............... 219/121.7 |
| 5,287,165 A | * | 2/1994 | Ulich et al. ................. 356/121 |
| 5,444,572 A | * | 8/1995 | Gal et al. .................... 359/619 |
| 6,324,195 B1 | * | 11/2001 | Suzuki et al. ................. 372/25 |
| 6,407,363 B1 | | 6/2002 | Dunsky et al. ......... 219/121.71 |
| 6,433,301 B1 | | 8/2002 | Dunsky et al. ......... 219/121.67 |
| 6,531,677 B1 | | 3/2003 | Arai et al. ............. 219/121.71 |
| 6,572,230 B1 | * | 6/2003 | Levine ........................ 351/221 |
| 6,609,794 B1 | * | 8/2003 | Levine ........................ 351/221 |
| 6,610,960 B1 | | 8/2003 | De Steur et al. ......... 219/121.71 |
| 6,696,008 B1 | | 2/2004 | Brandinger ................. 264/400 |
| 2003/0213787 A1 | * | 11/2003 | Dunsky et al. ......... 219/121.75 |

* cited by examiner

Primary Examiner—M. Alexandra Elve
(74) Attorney, Agent, or Firm—Davis & Bujold, P.L.L.C.

(57) ABSTRACT

An improved beam for use in ablating a surface to be processed. The improved beam front has a profile with a plurality of undulation and the plurality of undulations define a plurality of annular peaks and annular valleys. An intensity of each annular peak is about 10 percent greater than an intensity of each annular valley whereby the undulation of the improved beam facilitates formation of a substantially uniform feature in the surface to be processed. A method of utilizing an improved beam to form the desired feature in a surface to be processed is also disclosed. To reduce energy losses, a fourier transform is performed on the supplied laser beam. Before striking the surface, this beam passes through a focusing lens which performs a reverse fourier transform and retransforms the wave front substantially back to its originally wave form and intensity.

19 Claims, 10 Drawing Sheets

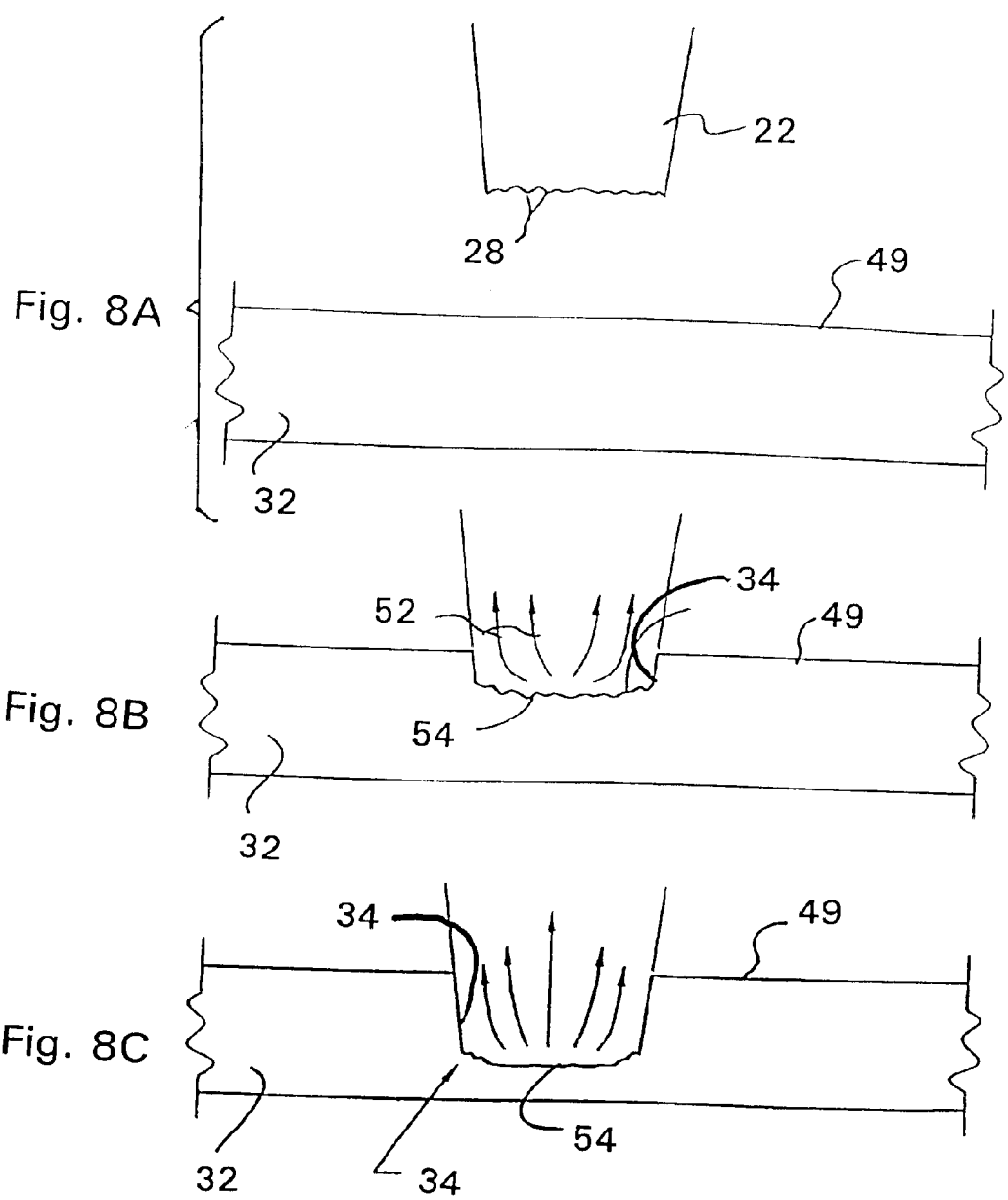

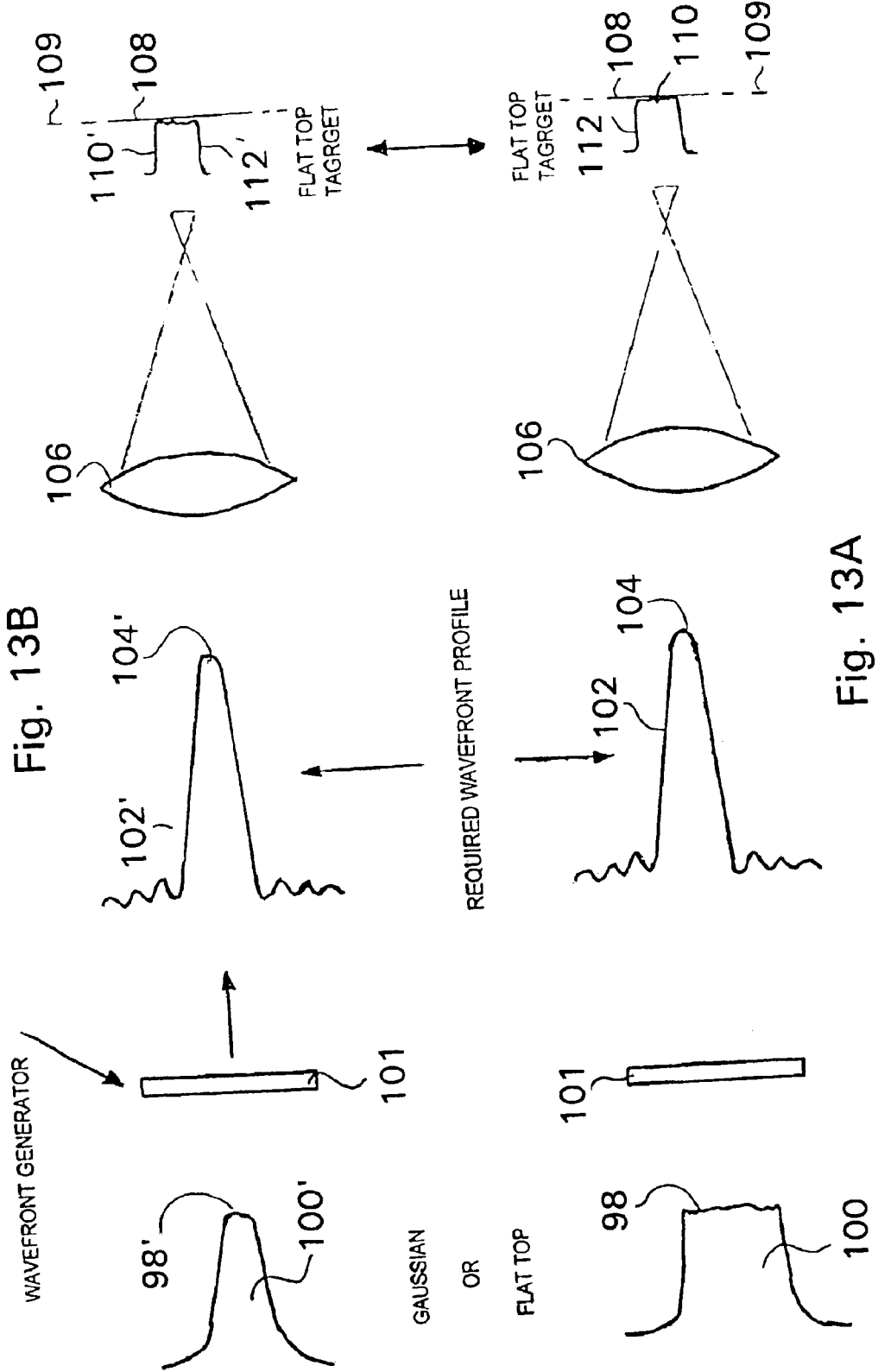

BEAM OR WAVE FRONT

CROSS REFERENCES TO RELATED APPLICATIONS

The present Application is related to and claims benefit of U.S. Provisional Patent Application Ser. No. 60/365,405 filed Mar. 18, 2002 by Todd E. Lizotte for an Improved Beam or Wave Front.

FIELD OF THE INVENTION

The present invention relates to an improved beam or wave front to facilitate a more uniform and concentric drilling or ablation in a surface of a substrate or object to be processed.

BACKGROUND OF THE INVENTION

In the prior art, there have been attempts to achieve a substantially flat top or pseudo flat top wave front or beam for use in a drilling or otherwise forming a blind via, hole, an aperture or other desired formation in a surface to be processed. One such pseudo flat top wave front or beam is generally shown in FIG. 1 of the drawings and this type of beam generally, when striking a surface to be processed, forms a blind via or aperture therein which has a shape generally depicted in FIG. 2 of the drawings. The problem with this type of blind via or aperture is that a depth of the blind via or aperture tends to be deeper around the perimeter of the via than it is in the center. This non uniformity results in a blind via or aperture which may be unacceptable for some manufacturing operations or processes.

The inventor believes that one of the problems associated with flat top or pseudo flat top wave fronts or beams is that edge diffraction occurs as the wave front or beam strikes or contacts the surface to be processed. This edge diffraction has a tendency to increase the drilling depth of the blind via or aperture around the perimeter thereof and this results in a blind via or aperture which has an undesirable contour or profile. As can be seen in FIG. 1, a well known laser beam 2, with a fat top or pseudo flat top wave front 4, is diagrammatically depicted. This type of laser beam 2 has an intensity "I" and a diameter "D" and is typically used for drilling and forming holes in objects. However, one major problem with the laser beam 2, when drilling a blind hole in a desired object, for example, is the formation of an uneven base surface 6 at the bottom of the blind via 8. This uneven base surface 6 is generally shown in FIG. 2.

The perimeter region 10 of the blind via 8 is cut significantly deeper than a central region 12 of the blind via 8 thus creating the uneven base surface 6. This defect may increase manufacturing time, result in an improper fit of a desired component, or even possible rejection or discarding the object 14. All of these scenarios ultimately increase the associated manufacturing and assembly costs and are to be avoided. Therefore, the flat top wave front 4 is generally unacceptable for many manufacturing applications, especially when close tolerances are required.

SUMMARY OF THE INVENTION

Wherefore, it is an object of the present invention to overcome the above mentioned shortcomings and drawbacks associated with the prior art wave fronts or beams.

Another object of the present invention is to provide the beam with a profile which minimized the edge diffraction effect to result in the drilling or formation of a more uniform blind via, hole, aperture or some other desired formation in a surface to be processed.

A further object of the present invention is to accentuate the intensity of the beam or wave front about its perimeter, especially when drilling through metal surfaces, to facilitate a precise and uniform blind via, hole, aperture or some other desired formation in a surface to be processed while minimizing the amount of annealing, or some other undesired side effect, which may occur as a result of such drilling.

A further object of the present invention is to provide a more uniform plasma, as the laser beam strikes the surface of the object to be processed and to provide a more average extenuation of the plasma resisting the supply laser beam and this facilitates a more uniformly drilled or formed aperture or feature formed in the surface to be processed.

Yet another object of the present invention is to vary the intensity of the beam or wave front, from a center longitudinal axis of the beam or wave front radially outward toward the perimeter of the beam or wave front, to form a plurality of annular peaks and annular valleys which facilitate a more uniform formation of a blind via, hole, aperture or some other desired formation in a surface to be processed.

A common problem that occurs with flat and pseudo flat laser beams or wave fronts is that when the beam strikes the surface of the object to be drilled and commences formation of the blind via, hole, aperture or other formation therein, a plasma is generated which typically emanates from the central portion of the formed hole, aperture or other feature being formed in the surface of the object to be processed. This plasma emanates from the central area of the hole, aperture or other feature being formed in the surface and is believed to attenuate the central portion of the laser beam thereby decreasing the depth of the central area of the hole, aperture or other feature being formed in the surface but not diminishing the perimeter portion of the hole, aperture or other feature being formed in the surface. The non attenuated beam tends to result in a deeper drilled depth around the circumference or perimeter of the hole, aperture or other formation while the attenuated beam tends to result in a shallower drilled depth in the central portion of the hole aperture or formation. The inventor has found that by modifying the wave front so that it has a plurality of annular peaks and annular valleys, such modification results in a more uniform plasma so that the attenuation by the plasma is experienced more uniformly across the entire beam or wave front and this results in a drilled hole, aperture or other feature in the surface of the object to be processed having a more uniformly and consistently drilled depth for the entire hole, aperture or other formation in the surface.

The present invention also relates to an improved beam for use in ablating a surface of an object to be processed, the improved beam front having a profile with a plurality of undulations, the plurality of undulations defining a plurality of annular peaks and annular valleys, and an intensity of the annular peaks being about 10 percent greater than an intensity of the annular valleys whereby the undulations of the improved beam facilitating formation of the uniform feature in the surface to be processed.

The present invention also relates to a method of utilizing an improved beam to form the desired feature in a surface to be processed, the method comprising the steps of: emitting a beam from a laser; shaping the emitted beam to have a profile with a plurality of undulations, the plurality of undulations defining a plurality of annular peaks and annular valleys, and an intensity of the annular peaks being about 10 percent greater than an intensity of the annular valleys; and contacting a surface to be processed with the improved beam so that the undulations of the improved beam facilitating formation of a uniform feature in a surface to be processed.

BRIEF DESCRIPTION OF THE DRAWING(S)

The invention will now be described, by way of example, with reference to the accompanying drawings in which:

FIGS. 8A–8C are diagrammatic cross-section views showing the formation of a blind via, in a surface to be processed, by the laser beam according to FIG. 3;

FIG. 13A is a diagrammatic representation which shows a square profile wave front being first transformed into an airy disc format, by a fourier transform, and then being transformed into a desired wave front, by a reverse fourier transform, as the transformed wave front passes through a lens;

FIG. 13B is a diagrammatic representation which shows a guassian wave front being first transformed into an airy disc format, by a fourier transform, and then being transformed into a desired wave front, by a reverse fourier transform, as the transformed wave front passes through a lens;

Figure 14A:
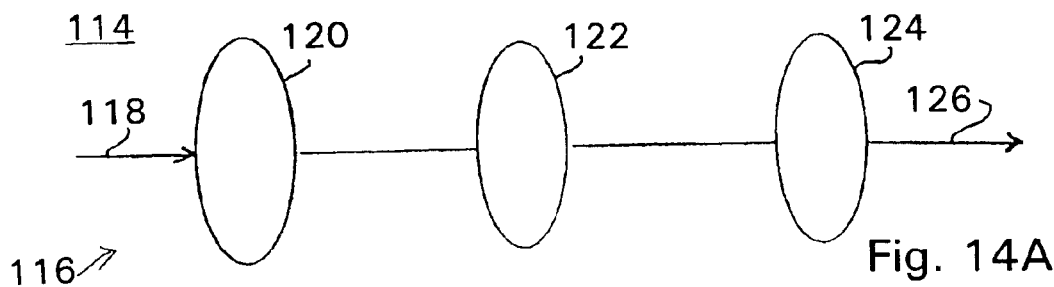
FIG. 14A illustrates a wavefront shaper of three separate optical elements arranged in the order compression element—shaping element—collimating element.
Figure 14B:
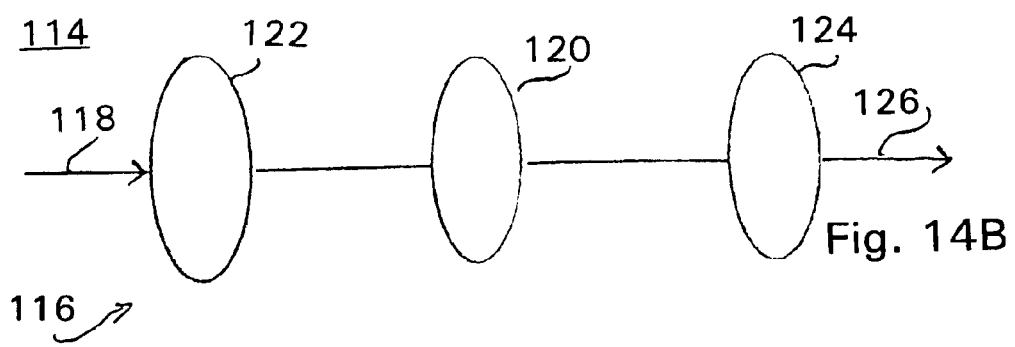
FIG. 14B illustrates a wavefront shaper of three separate optical elements arranged in the order shaping element—compression element—collimating element.
Figure 14C:
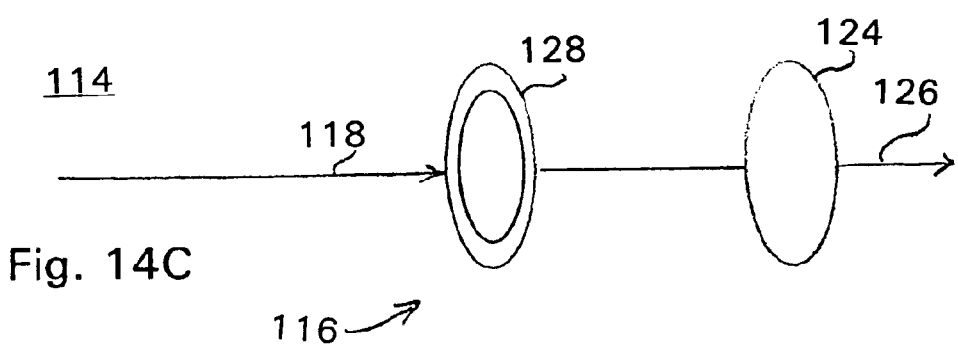
Figure 14D:
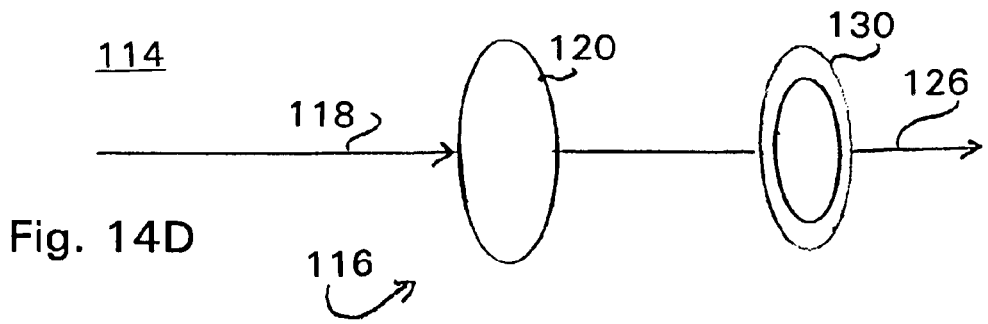

FIG. 14C illustrates a wavefront shaper wherein a single optical elements performs two functions and wherein the optical elements are arranged in the order shaping/compression element—collimating element; and, FIG. 14D illustrates a wavefront shaper wherein a single optical elements performs two functions and wherein the optical elements are arranged in the order compression element—shaping/collimating element.

DETAILED DESCRIPTION OF THE INVENTION

Figure 3:
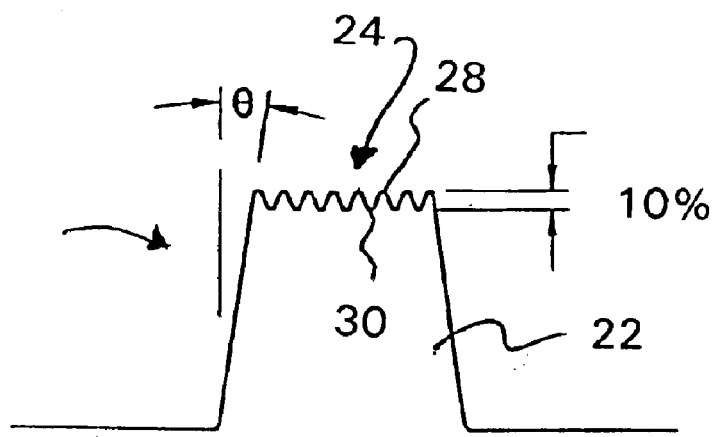
FIG. 3 is a diagrammatic representation of a first embodiment of the improved laser beam according to the present invention.
Figure 2:
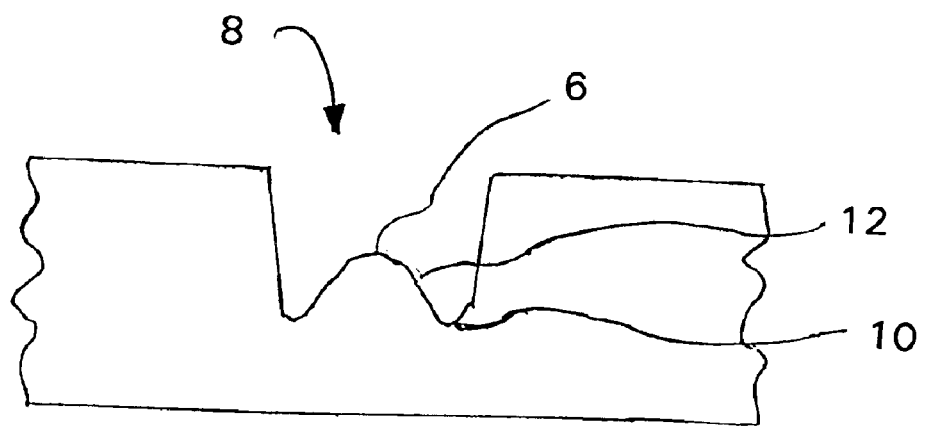
FIG. 2 is a diagrammatic cross-section showing a blind hole formed in a surface to be processed by the beam of FIG. 1.

A first embodiment of an improved laser beam 22, according to the present invention, is shown in FIG. 3. The inventor has determined that by altering the shape or profile of the wave front 24 of the laser beam 22 so that the wave front 24 has a plurality of undulations comprising a plurality of alternating annular peaks 28 and annular valleys 30 which extend radially from a center, or central longitudinal axis, of the beam 22. The improved laser beam 22, of the present invention, when contacting or striking a surface to be processed 32, facilitates a more uniform blind via, hole, aperture or other formation 34 in the surface of the object to be processed 32. If the blind via, hole, aperture or some other formation 34 in the surface of the object to be processed 32 can be adequately formed by a single or minimal amount of firings of the laser, this reduces the manufacturing time in order to obtain an acceptable blind via, hole, aperture or some other formation 34 in the surface of the object to be processed 32. This, in turn, increases the throughput of the manufacturing equipment utilizing the improved laser beam 22 according to the present invention. Preferably, the annular peaks 28 will have an intensity of at least about 10 percent greater than an intensity of the annular valleys 30 of the laser beam 22 and the wave front 24 will have a plurality of annular peaks 28 and annular valleys 30 forming the laser beam 22. Preferably, the diameter of the laser beam will taper toward the leading end of the beam at an angle θ of between 0 and 20 degrees.

Figure 1:
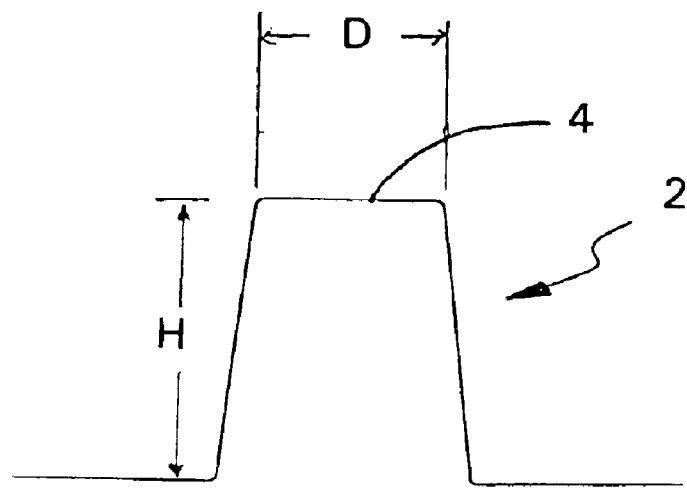
FIG. 1 is a diagrammatic representation showing the intensity versus the diameter of a prior art beam.
Figure 4:
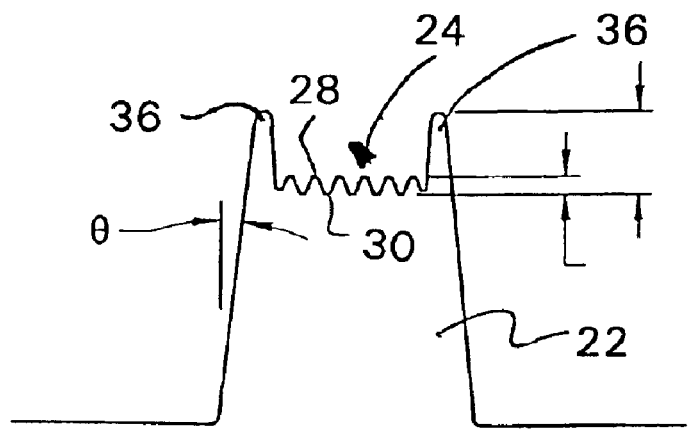
FIG. 4 is a diagrammatic representation of another embodiment of the improved laser beam according to the present invention.

FIG. 4 depicts a second embodiment of the improved laser beam 22 according to the present invention. This embodiment is similar to the embodiment in FIG. 3 with the addition of an enlarged annular perimeter peak 36 circumscribing the entire perimeter of the wave front 24. The enlarged annular perimeter peak 36 is approximately 10–30 percent or so greater than the intensity of the annular valleys 30. This embodiment is particularly advantageous when drilling into an object 32 which comprise multiple layers of different materials, as can be generally seen in FIGS. 9A–9C. A further description concerning the same will follow below.

Figure 5:
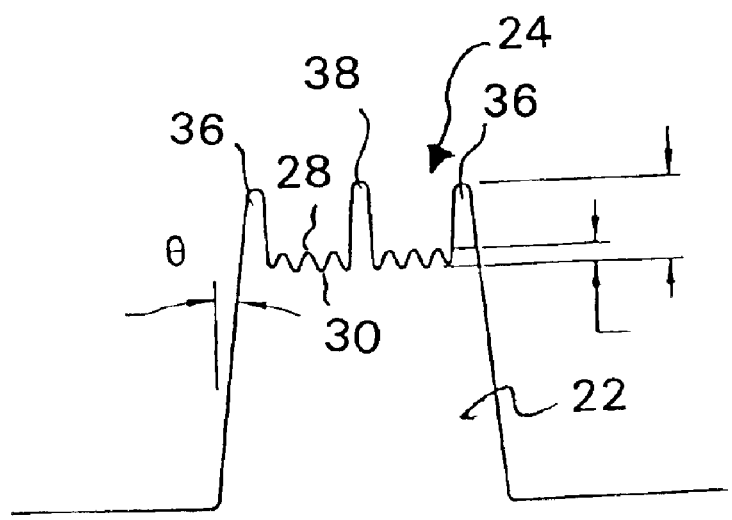
FIG. 5 is a diagrammatic representation of yet another embodiment of the improved beam according to the present invention.

A third embodiment of the improved laser beam 22, according to the present invention, is shown in FIG. 5. This embodiment is similar to the embodiment of FIG. 4 with the addition of an enlarged central peak 38. Enlarged central peak 38 further assists with an initial first cut into an object 32 prior to the remainder of the wave front 24 contacting the object to be processed 32. The enlarged annular perimeter peak 36 and the enlarged control peaks 38 both have an intensity which is approximately between 10 and 30 percent or so greater than the intensity of the annular valleys 30, and more preferably about 15 percent or so greater than the intensity than the annular valleys 30.

Figure 6:
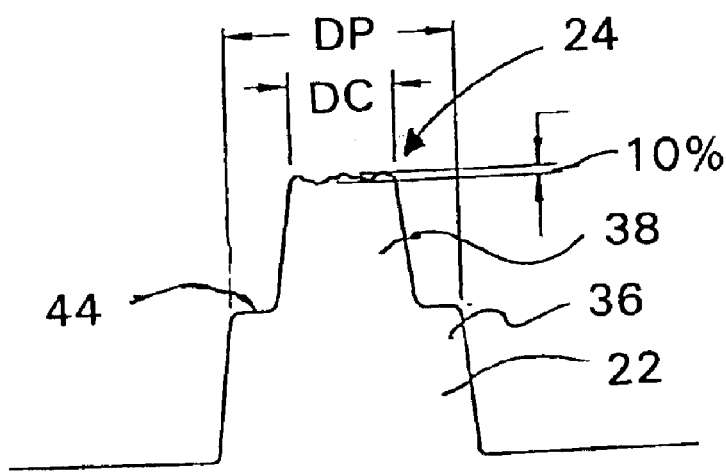
FIG. 6 is a diagrammatic representation of another embodiment of the improved beam according to the present invention.

With reference to FIG. 6, a fourth embodiment of the improved laser beam 22, according to the present invention, can be seen. According to this embodiment, laser beam 22 has a central peak 38 having a first intensity and annular perimeter peak having a second intensity with the first intensity being approximately between 10 and 50 percent or so greater than the intensity of the annular perimeter peak 36, and more preferably about 30 percent or so greater than the intensity of the annular perimeter peak 36. The diameter DC of the central peak 38 is approximately between 10 and 50 percent or so less than the diameter of the annular perimeter peak 36, and more preferably about 30 percent or so less than the diameter DP of the annular perimeter peak 36. A smooth transition or step 44 integrates the central peak 38 with the annular perimeter peak 36. It is to be appreciated that the intensity and/or diameter of the central peak 38 and of the annular perimeter peak 36 can be modified, as necessary, as would be apparent to one skilled in the art, to suit the desired application.

Figure 7:
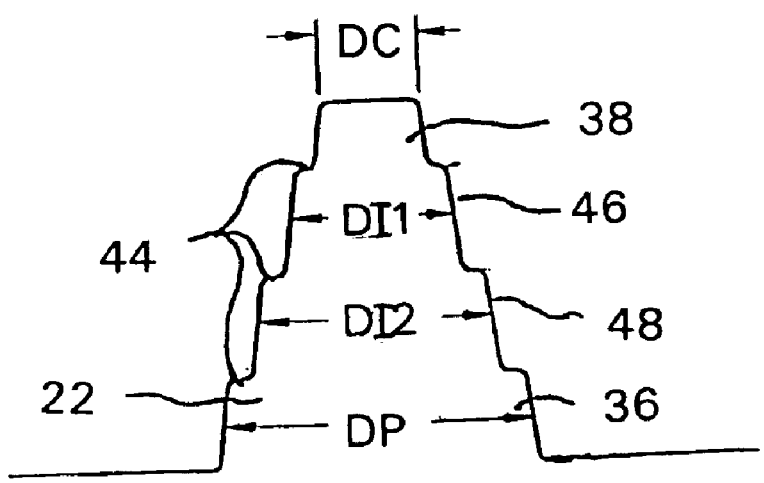
FIG. 7 is a diagrammatic representation of another embodiment of the improved beam according to the present invention.

A fifth embodiment of the improved laser beam 22, according to the present invention, is shown in FIG. 7. This embodiment is similar to the embodiment of FIG. 6 but includes a plurality of smooth transitions or steps 44 to integrate the central peak 38 with the annular perimeter peak 36. According to this embodiment, laser beam 22 has a central peak 38 having a first intensity and an annular perimeter peak 36 having a second intensity with the central peak 38 being approximately between 120 and 400 percent or so greater than the intensity of the perimeter peak 36. In addition, at least one and preferably a plurality of intermediate annular peaks 46, 48 are located between the central peak 38 and the annular perimeter peak 36. Each intermediate annular peak 46, 48 has a diameter DI1, DI2 which is approximately between 20 and 150 percent or so greater than the diameter DC of the central peak 38. Stated another way, each step can be a desired percentage of the entire intensity of the beam 22. A smooth transition or step 44 integrates each peak 36, 38, 46 or 48 with each adjacent peak 36, 38, 46 or 48. As with the previous embodiment, it is to be appreciated that the intensity and/or diameter of each peak 36, 38, 46 or 48 can be modified, as necessary, as would be apparent to one skilled in the art, to suit the desired application.

Now with reference to FIGS. 8A–8C, a detailed description concerning use of the laser beam 22, according to the present invention, to drill a hole will now be provided. As can be seen in these Figures, a laser beam 22 is diagrammatically shown approaching a surface 49 of an object to be processed 32 (see FIG. 8A). Upon contacting the surface of the object to be processed 32, the annular peaks 28 of the laser beam 22 strike and penetrate the surface 49 of the object to be processed 32 and commence formation of the blind via 34 (see FIG. 8B). As the laser beam 22 penetrates the surface 49 of the object to be processed 32, the material 50 forming the surface 49 is ablated and tends to be carried away, from the blind via 34 being formed, with the exhaust stream 52 from the laser beam 22. This exhaust stream 52 is believed to attenuate the laser beam 22 and thereby hinder formation of the blind via 34 having the desired profile. The improved laser beam 22, according to the present invention, overcomes this drawback by compensating for the attention of the exhaust stream 52 and thereby results in the formation of a blind via 34 with a flatter and more uniform base surface 54 (e.g. ±5% variation in the base surface), as can be seen in FIG. 8C.

Figure 9A:
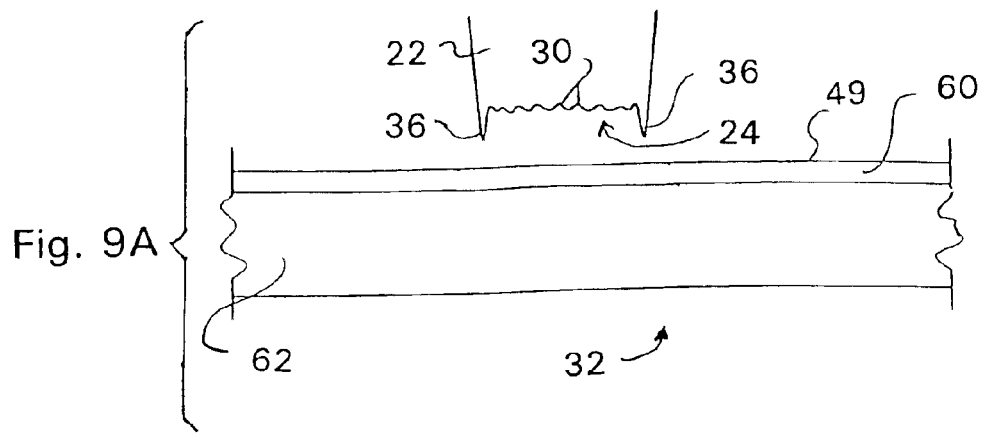
FIGS. 9A–9C are diagrammatic cross-section views showing the formation of a blind hole, in a surface to be processed, by the laser beam according to FIG. 4.
Figure 9B:
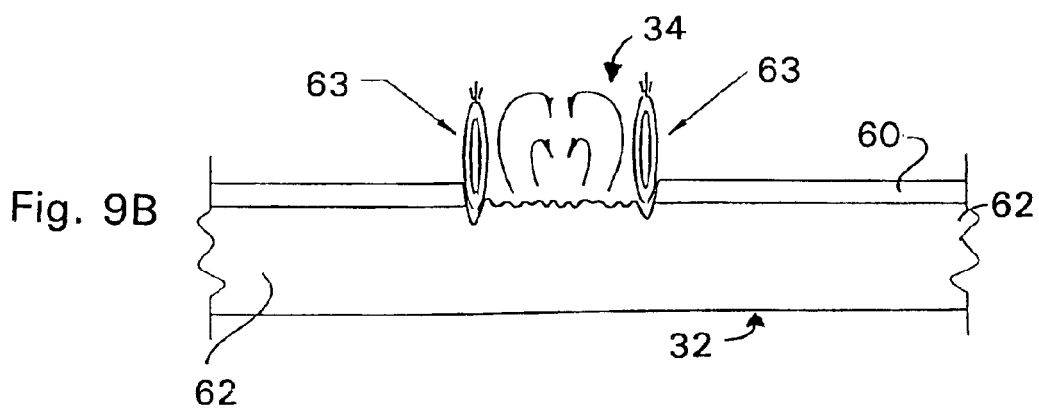
Figure 9C:
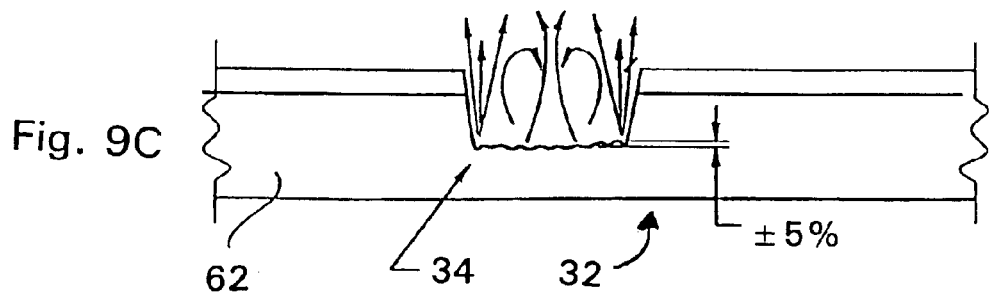

With reference now to FIGS. 9A–9C, formation of a blind via, hole, aperture or some other formation 34 in an object, having two distinct layers 60, 62, will now be discussed. When forming the desired blind via, hole, aperture or some other formation 34 in an object to be processed 32 which has, for example, a metallic layer 60, such as copper, on a top surface thereof, it is desirable to alter the shape or profile of the improved laser beam 22 so that the intensity of an enlarged perimeter portion 36 of the wave front 24 is of an intensity which is at least about 15 percent or so greater than an intensity of the annular valleys 30 of the laser 22. A diagrammatic representation of one embodiment of the improved beam 22, according to the present invention, is depicted in FIG. 9A.

As the laser beam 22 strikes or contacts the surface to the object to be processed 32 (see FIG. 9B), the accentuated intensity of the enlarged perimeter portion 36 of the wave front 24 strikes the metallic layer 60 to provide a clean fracture or perimeter opening in the metallic layer 60. This facilitates a substantially complete obliteration of the metallic layer 60 covering the area where the desired blind via, hole, aperture or some other formation 34 is to be formed in the object to be processed 32. The accentuated intensity of the enlarged annular perimeter peak 36 of the beam or wave front also minimizes the amount of annealing of the metallic layer 60 which might otherwise occur as a result of using a pseudo or flat top beam of the prior art. In addition, it is believed that the increased intensity of the enlarged annular perimeter peak 36 generates eddy pockets 63 of an intense plasma which also acts as a wall that facilitates containing a central plasma. The central plasma then is able to cut out or drill the surface of the second layer 62 in a uniform manner. Once the laser beam 22 penetrates through the metallic layer 60, the beam or wave front continues ablating or drilling a desired blind via, hole, aperture or other formation 34 to be formed made in the second layer 62 of the object to be processed 32. Following completion of the drilling process, the object to be processed will have a profile which will be somewhat similar to the profile shown in FIG. 9C.

Figure 10:
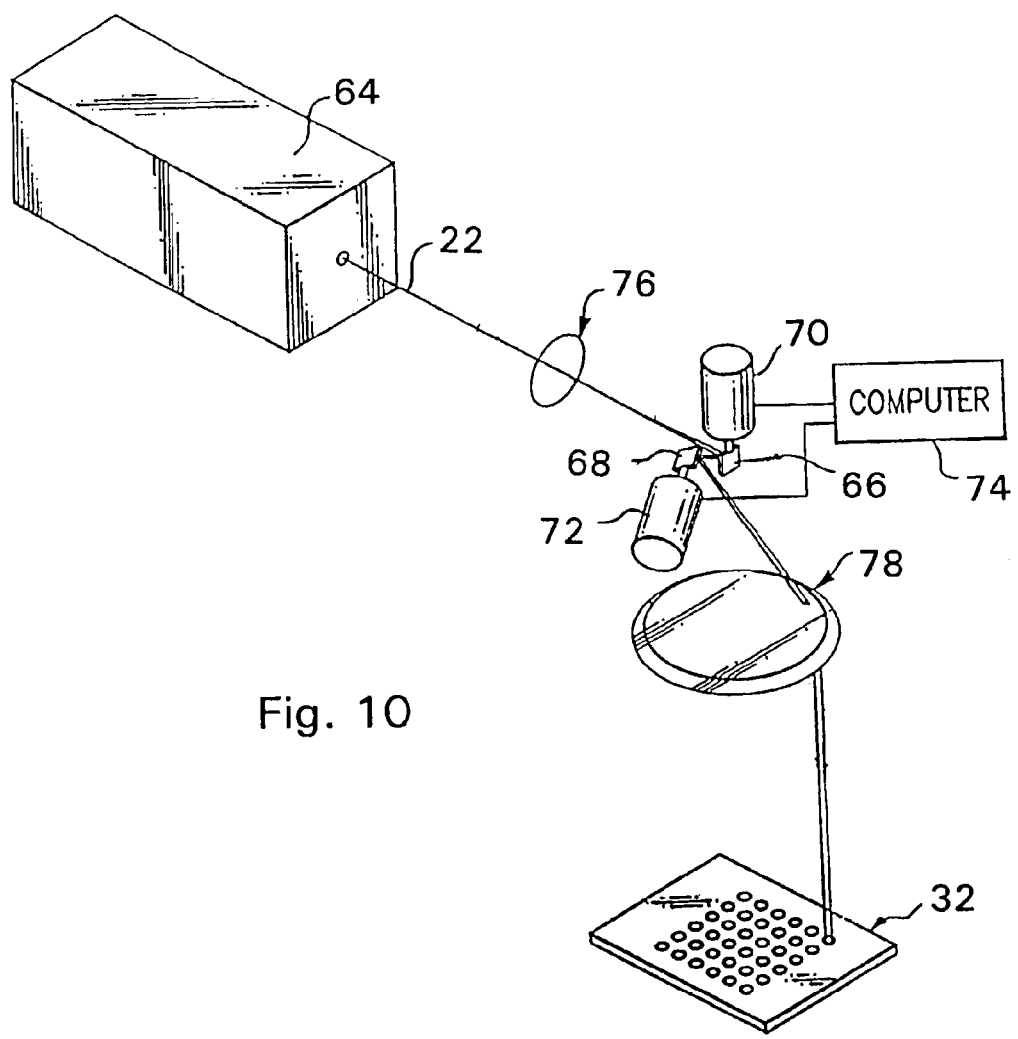
FIG. 10 is a diagrammatic representation of an apparatus for generating the improved laser beam according to the present invention.

Turning now to FIG. 10, a brief description concerning an embodiment for generating the improved beam or wave front, according to the present invention, will now be briefly discussed. As can be seen in this Figure, a conventional laser 64 is used to generate a laser beam 22, and the laser beam 22 is directed toward first and second mirrors 66, 68 of first and second repeat positioning devices 70, 72 which are coupled to and controlled by a conventional computer 74. Prior to reaching the first mirror 66, 68, the laser beam 22 passes through a beam shaping device, such as a diffractive element, a holographic element, etc., generally indicated as element 76, which changes the shape and/or profile of the laser beam 22, in a conventional manner, from a guassian beam or wave front to a semi-pseudo flat wave front laser beam 22, as discussed above. The altered laser beam 22 is then reflected by first and second mirrors 66, 68, of first and second repeat positioning devices 70, 72 toward a focusing lens 78, such as an F-theta lens. Finally, the focusing lens 78 focuses the supplied laser beam 22 at a top surface of the object to be processed 32.

Although the inventor is not sure why or how the improved beam or wave front, according to the present invention, provides superior drilling characteristics, the inventor believes that by shaping the beam or wave front to have a plurality of undulations with the annular peaks 28 and annular valleys 30, the variation in intensity of the illumination facilitates the formation of eddy pockets 63 or areas in the hole, aperture or other formation 34 to be made and such eddy pockets 63 or areas facilitate a more uniform ablation and removal of the metallic layer 60 or lower second substrate layer 62. The eddy pockets or areas may tend to create turbulence within the hole, aperture or other formation 34 and thereby results in an opening having a profile generally as shown in FIG. 9B.

Figure 11:
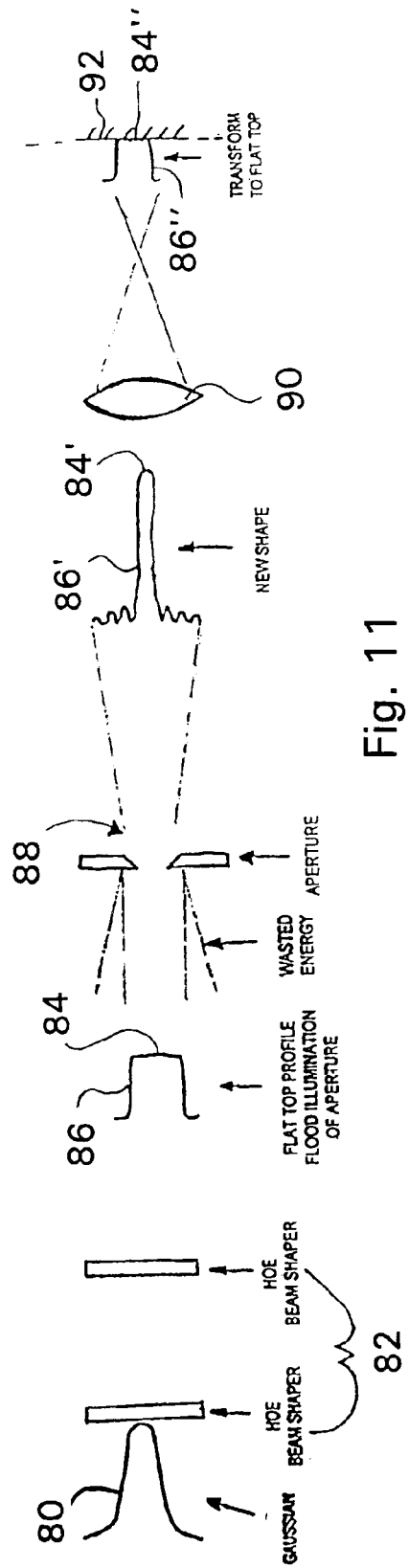
FIG. 11 is a diagrammatic representation showing a first transformation of the wave front, as the wave front passes through an aperture which generates edge diffraction losses, and a second transformation as that wave front then passes through a lens.

One problem which inherently occurs to a wave front as a laser beam passes through an aperture is edge diffraction. With reference to FIG. 11, this "transformation" of the wave front of the laser beam will now be described. The laser beam 80, e.g., a guassian beam, is emitted and passes through at least one, and possibly two, HOE beam shapers 82. The beam shapers 82 alter the supplied beam to have generally a pseudo flat top wave front indicated as 84. As the altered laser beam 86 passes though the aperture 88, the outer perimeter of the wave front 84 of the laser beam 86 is altered to the shape shown in the middle section of FIG. 11. That is, the diffracted wave front 84' of the laser beam 86' has a shape very similar to that of an airy disc format. The problem with edge diffraction is that some of the energy of the supplied laser beam 86 is scattered and lost due to the edge diffraction effect and this decreases the efficiency of the laser beam 86. In fact, some of the beam energy does not pass through the aperture 88 and reflected away from the aperture 88.

The diffracted wave front 84' of the laser beam 86' is then directed at and passes through a focusing lens 90 before contacting or striking the surface to be processed 92. As the diffracted wave front 84' of the laser beam 86' passes through the focusing lens 90, the focusing lens 90 provides a reverse fourier transform to the diffracted wave front 84' of the laser beam 86' to retransform the diffracted wave front 84' generally back to its originally wave form shape as shown following passing through the beam shapers 82, e.g. its original shape prior passing through the aperture 88 and having its outer perimeter altered by edge diffraction. This retransformed wave front shape is designated by reference numeral 84". However, the intensity of the transformed and retransformed wave front 84" of the laser beam 86" has less intensity, e.g., possibly 10–50% less intensity due to edge diffraction, than the intensity of the original wave front 84 of the laser beam 86 before passing through the aperture 88.

Figure 12A:
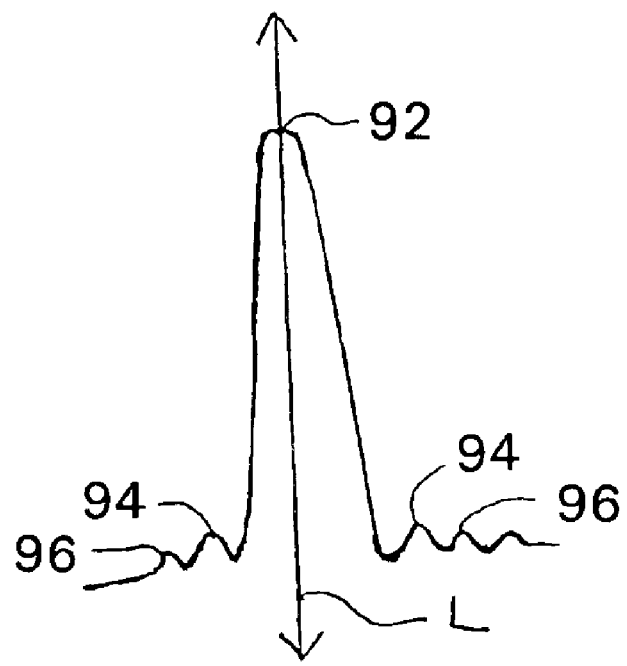
FIG. 12A is a diagrammatic longitudinal section of an airy disc form of a laser beam.
Figure 12B:
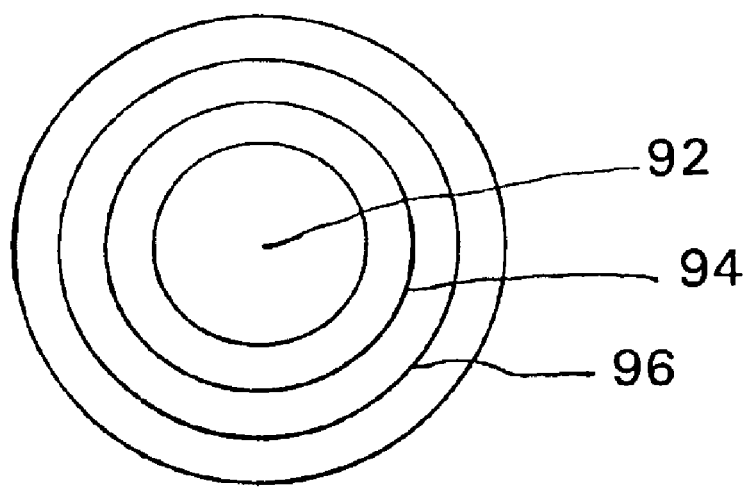
FIG. 12B is a diagrammatic transverse section through the airy disc form of the laser beam of FIG. 12A.

With reference now to FIGS. 12A and 12B, a discussion of the airy disc format, formed when passing through a circular aperture, will now be provided. As can be seen in both of these Figures, the centrally located peak 92 of the laser beam which is coincident or adjacent with a longitudinal axis L of the beam has the greatest intensity. The intensity of the beam diminishes quite radically in a radial direction. As a result of this, a peripheral region of the beam has a second annular peak 94 with an intensity of about 5–10% or so, circumscribing the longitudinal axis L of the beam. A third annular peak 96, having intensity of about 1–5% or so, circumscribes both the central and the second annular peaks of the beam. In general, the intensity of the annular peaks diminishes quite radically the further the annular peaks are spaced from the longitudinal axis L of the beam. It is to be appreciated that various other airy disc format wave fronts can be generated depending upon the shape and size of the aperture through which the beam passes through or the number of apertures illuminated.

One solution to avoiding the edge diffraction effect noted above is to initially start with a square profile wave front 98, i.e., a flat top beam, for a laser beam 100 (see FIG. 13A) and then perform a fourier transform on that laser beam 100 via a conventional wave front generator 101. The fourier transform of the square profile wave front laser beam is shown in the middle portion of FIG. 13A and designated as 102. This results in the laser beam 102 having a wave front 104 very similar to the airy disc format shown and described in FIGS. 12A and 12B except that the edge diffraction effect, described with reference to FIG. 11 above, is substantially minimized so that the intensity of the fourier transformed laser beam 102 is not significantly diminished from that of its initial intensity of the laser beam 100, i.e., no edge diffraction losses occur, and the overall efficient of the fourier transformed laser beam 102 is substantially retained. The fourier transformed wave front 104 of the laser beam 102 is then directed at and passes through a focusing lens 106 before contacting or striking the surface to be processed 108. As the fourier transformed wave front 104 of the laser beam 102 passes through the focusing lens 106, the focusing lens 106 provides a reverse fourier transform to the fourier transformed wave front 104 of the laser beam 102 to retransform the fourier transformed wave front substantially back to its originally wave form shape, e.g. the laser beam shape prior to the initial fourier transform of the laser beam 100, and this wave front shape is formed at the image plane 109 of the imaging lens 106 and is designated by reference numeral 112. Due to the elimination of edge diffraction losses which occur when the beam passes through an aperture, the intensity of the transformed and retransformed wave front 112 of the laser beam 110 has substantially the same intensity as the intensity of the original wave front 98 of the laser beam 100 prior to the fourier transform. When the retransformed wave front 112 of the laser beam 110 strikes the surface to be processed 108, virtually all of the supplied energy is utilized to drill, burn or form a more uniform blind via, hole, aperture or some other desired formation in the surface to be processed.

A second embodiment, for avoiding the edge diffraction effect noted above, is shown in FIG. 13B for a guassian wave front. The guassian wave front 98' for a laser beam 100' passes through a conventional wave front generator 101 where the wave front generator creates a representative fourier transform of a pseudo flat top wave front profile on that laser beam 100'. The fourier transform of the guassian wave front laser beam is shown in the middle portion of FIG. 13B and designated as 102'. This results in the laser beam 102' having a wave front 104' very similar to the airy disc format shown and described in FIGS. 12A and 12B except that the edge diffraction effect, described with reference to FIG. 11 above, is substantially minimized so that the intensity of the fourier transformed laser beam 102' is not significantly diminished from that of its initial intensity of the laser beam 100', i.e., no edge diffraction losses occur, and the overall efficient of the fourier transformed laser beam 102' is substantially retained.

The fourier transformed wave front 104' of the laser beam 102' is then directed at and passes through a focusing lens 106 before contacting or striking the surface to be processed 108. As the fourier transformed wave front 104' of the laser beam 102' passes through the focusing lens 106, the focusing lens 106 provides a reverse fourier transform to the fourier transformed wave front 104' of the laser beam 102' to retransform the fourier transformed wave front substantially to a square profile wave front, e.g., a flat top beam or any other desired wave front at the image plane, for a laser beam and this wave front shape is formed at the image plane 109 of the imaging lens 106 and is designated by reference numeral 112'. Due to the elimination of edge diffraction losses which occur when the beam passes through an aperture, the intensity of the transformed and retransformed wave front 112' of the laser beam 110' has substantially the same intensity as the intensity of the airy disc wave front 104' of the laser beam 102'. When the retransformed wave front 112' of the laser beam 110' strikes the surface to be processed 108, virtually all of the supplied energy is utilized to drill, burn or form a more uniform blind via, hole, aperture or some other desired formation in the surface to be processed.

Figure 13C:
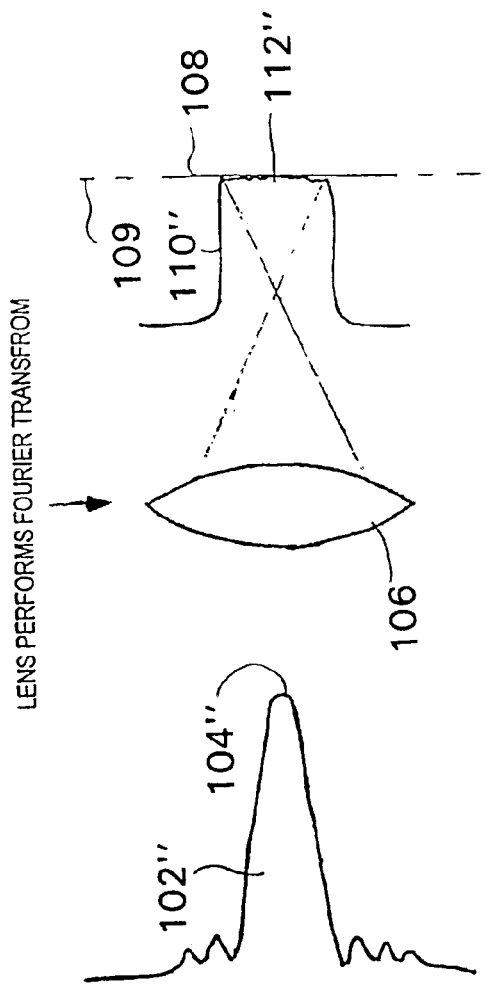
FIG. 13C is a diagrammatic representation which shows generation of an airy disc format of a wave front which is transformed into a desired wave front, by a fourier transform, as the wave front passes through a lens.

A third embodiment, for completely avoiding the edge diffraction effect, is shown in FIG. 13C. According to this embodiment, a desired airy disc format wave front, having a wave front 104" very similar to the airy disc format shown and described in FIGS. 12A and 12B, is generated in a conventional manner. As the wave front does not pass through an aperture, no edge diffraction effects occur and the overall efficiency of the system is improved over the embodiments of FIGS. 13A and 13B.

The generated wave front 104" of the laser beam 102" is then directed at and passes through a focusing lens 106 before contacting or striking the surface to be processed 108. As the generated wave front 104" of the laser beam 102" passes through the focusing lens 106, the focusing lens 106 provides a fourier transform to the generated wave front 104" of the laser beam 102" to transform the wave front substantially to a square profile wave front, i.e., a flat top beam, for a laser beam and this wave front shape is formed at the image plane 109 of the imaging lens 106 and is designated by reference numeral 112". Due to the elimination of edge diffraction losses which occur when the beam passes through an aperture, the intensity of the transformed wave front 112" of the laser beam 110" has substantially the same intensity as the intensity of the airy disc wave front 104" of the generated laser beam 102". When the retransformed wave front 112" of the laser beam 110" strikes the surface to be processed 108, virtually all of the supplied energy is utilized to drill, burn or form a more uniform blind via, hole, aperture or some other desired formation in the surface to be processed.

Referring now to FIGS. 14A, 14B, 14C and 14D, therein are illustrated embodiments for generating the wavefronts of the present invention. In accordance with the above discussions, it will be recognized that the generation of an improved wavefront laser beam according to the present invention involves the transformation of an input beam having, for example, a flattop or gaussian wavefront, into a beam having an airy disc or similar wavefront, as illustrated, for example, in FIGS. 12A–12B or 13A–13C, and the transformation of that beam into a beam having the final desired wavefront, such as illustrated in FIGS. 3–7.

It will be apparent to those of skill in the arts that these laser beam forming operations in turn involve the shaping, compressing and collimating of the laser beams. As described above, the shaping, compressing and collimating operations are performed without the use of apertures or other elements that result in edge diffraction effects, that is, with the use of non-diffracting elements such as lenses or holographic optical elements (HOEs).

It will also be appreciated by those of skill in the relevant arts that while optical elements such as lenses and HOEs are commonly designed to perform a single operation, such elements may also be readily designed to perform two such operations, so that three such operations may be performed with only two optical elements. For example, a single lens or HOE may be designed and used to both shape and compress a beam, or to collimate and shape a beam. In addition, and with appropriate selection and design of the elements, the elements may be arrange and the operations performed on the beams in virtually any order.

Exemplary embodiments of Wavefront Shapers 114 comprised of Optical Elements 116 for generating improved laser wavefronts according to the present invention are illustrated in FIGS. 14A through 14D.

First considering arrangements wherein a Wavefront Shaper 114 is comprised of three separate Optical Elements 116, each performing a single function, FIG. 14A illustrates the sequential arrangement wherein an Input Beam 118 passes through the elements in the order Compression Element 120—Shaping Element 122—Collimating Element 124 to provide the final Shaped Output Beam 126. FIG. 14B in turn illustrates the functionally equivalent arrangement of Shaping Element 122—Compression Element 120—Collimating Element 124. In will be noted that Collimating Element 124 is the final element in each of these arrangements because Collimating Element 124 is most frequently comprised of and performs the function of focusing lens 78, as discussed with reference to FIG. 10, and is therefore most conveniently arranged as the final element of Wavefront Shaper 114. It must also be noted that Collimating Element 124 will typically be comprised of a lens, while Shaping Element 122 and Compression Element 120 may be comprised of Holographic Optical Elements (HOEs), or a combination of lenses and HOEs.

FIGS. 14C and 14D, in turn, illustrate examples of arrangements of Wavefront Shaper 114 wherein a single Optical Element 116 performs two functions, thereby reducing the required number of elements from three to two. FIG. 14C, for example, illustrates an arrangement having a Shaping/Compression Element 128 followed by a Collimating Element 124, while FIG. 14D illustrates a Compression Element 120 followed by a Shaping/Collimating Element 130. In these embodiments, and for example, a Shaping/Compression Element 128 or a Compression Element 120 may typically be comprised of a HOE. A Collimating Element 124 or a Shaping/Collimating Element 130 may, however, be typically comprised of a lens as discussed above, wherein it is shown that a lens such as lens 106 of FIGS. 13A and 13B may both function as a focusing lens 78 and may perform a reverse fourier transform of a laser beam wavefront.

It is to be appreciated that the present invention is also useful for illuminating or exposing a feature in a photo resist application or for removing gates, traces, etc., of fine metal or dielectrics used for memory and/or semiconductor fabrication, modification and/or repair. The present invention is also useful for imaging materials used in stereo lithography or formation of three-dimensional structures, such as the creation of micro-electro mechanical systems, etc.

Since certain changes may be made in the above described improved the laser beam or wave fronts, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An improved beam for use in ablating a surface of an object to be processed, the improved beam front having:
   a profile with a plurality of undulations, the plurality of undulations defining a plurality of annular peaks and annular valleys, and
   an intensity of the annular peaks being at least about 10 percent greater than an intensity of the annular valleys, whereby
   the undulations of the improved beam facilitate formation of a substantially uniform feature in the surface to be processed.

2. A method of utilizing an improved beam to form a desired feature in a surface to be processed, the method comprising the steps of:

emitting a beam from a laser;

shaping the emitted beam to have a profile with a plurality of undulations, the plurality of undulations defining a plurality of annular peaks and annular valleys, and an intensity of the annular peaks being at least about 10 percent greater than an intensity of the annular valleys; and contacting the surface to be processed with the improved beam so that the undulations of the improved beam facilitate formation of a substantially uniform feature in surface to be processed.

3. A wavefront shaper for generating from an input beam an output beam for use in forming desired features in a surface, comprising:

in order from input beam to output beam, one of a compressing and shaping element and a collimating element, a shaping and collimating element and a compression element, a shaping element, a compression element and a collimating element, and a compression element, a shaping element and a collimating element, wherein, one of the compressing and shaping element, the shaping and collimating element, the compression element, the shaping element and the collimating element is one of a holographic optical element and a lens.

4. The improved beam of claim 1, wherein the beam front further has an enlarged annular perimeter peak circumscribing entire perimeter of the profile.

5. The improved beam of claim 4, wherein the enlarged annular perimeter peak has an intensity of about 10–30 percent greater than the intensity of the annular valleys.

6. The improved beam of claim 4, wherein the beam front further has an enlarged central peak.

7. The improved beam of claim 6, wherein the enlarged central peak has an intensity of about 10–30 percent greater than the intensity of the annular valleys.

8. The improved beam of claim 1, wherein the beam front further has a central peak with a first intensity and an annular perimeter peak having a second intensity.

9. The improved beam of claim 8, wherein the first intensity of the central peak is approximately between 10–50 percent greater than the second intensity of the annular perimeter peak.

10. The improved beam of claim 8, wherein a diameter of the annular perimeter peak is approximately between 10 and 50 percent smaller than a diameter of the central peak.

11. The improved beam of claim 8, wherein the beam front further has a smooth transition integrating the central peak with the annular perimeter peak.

12. The improved beam of claim 8, the beam front further has a plurality of smooth transitions integrating the central peak with the annular perimeter peak.

13. The improved beam of claim 8, wherein the first intensity of the central peak is approximately between 120–400 percent greater than the second intensity of the annular perimeter peak.

14. The improved beam of claim 8, wherein the beam front has a plurality of successive intermediate annular perimeter peaks located between the central peak and the annular perimeter peak.

15. The improved beam of claim 14, wherein the beam front has a plurality of additional transitions, each of the plurality of additional transitions integrates one of the successive annular perimeter peaks with an adjacent successive annular perimeter peak.

16. The improved beam of claim 14, wherein each of the plurality of successive intermediate annular perimeter peaks has a diameter which is approximately between 20–150 percent greater that a diameter of the central peak.

17. The method of utilizing an improved beam of claim 2, comprising the step of further shaping the beam front to have an enlarged annular perimeter peak circumscribing an entire perimeter of the profile.

18. The method of utilizing an improved beam of claim 17, wherein the enlarged annular perimeter peak has an intensity of about 10–30 percent greater than the intensity of the annular valleys.

19. The method of utilizing an improved beam of claim 17, further comprising the step of further shaping the beam front to have an enlarged central peak with an intensity of about 10–30 percent greater than the intensity of the annular valleys.

* * * * *